UNITED STATES PATENT OFFICE 1,987,259

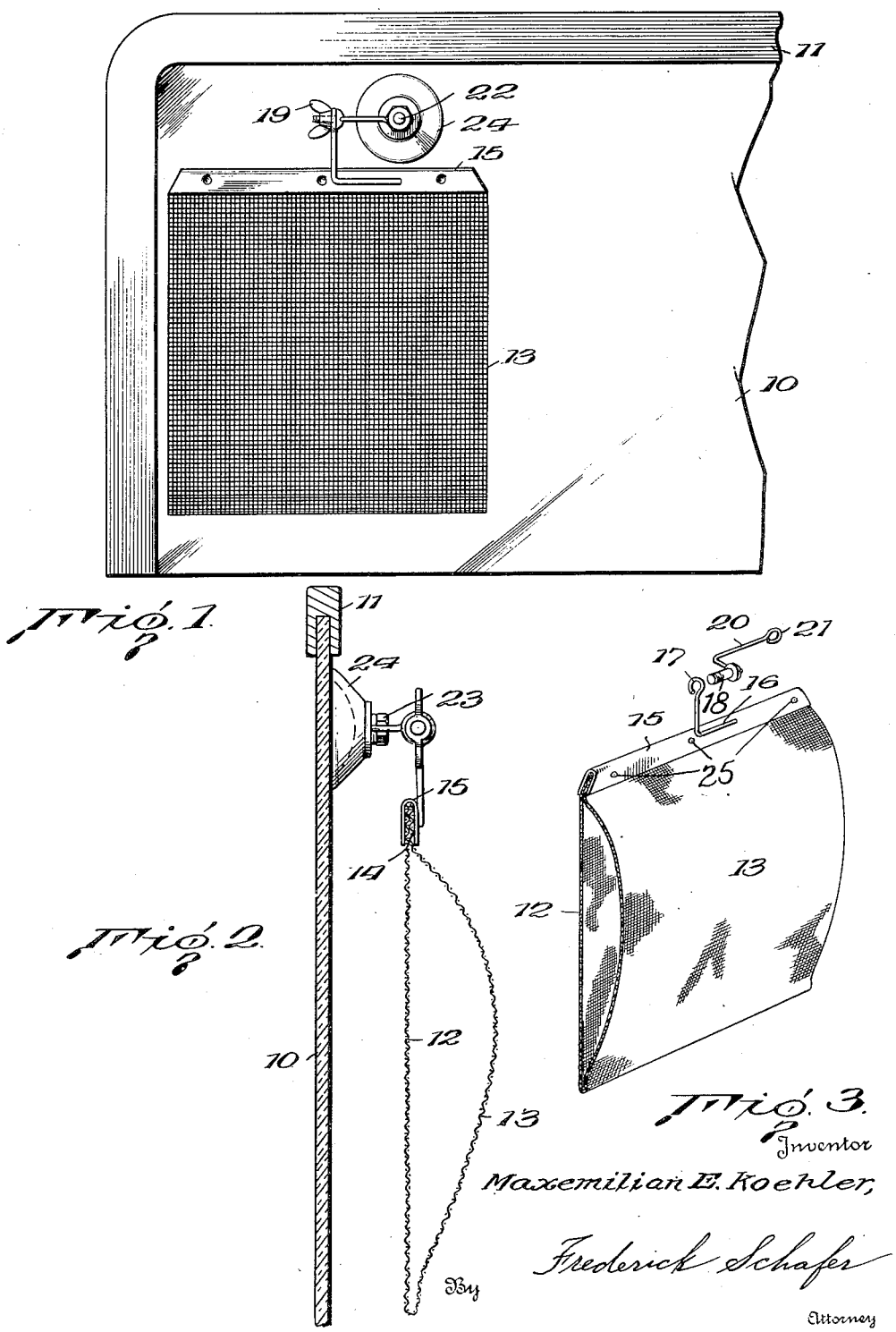

ANTIGLARE SCREEN

Maxemilian E. Koehler, Washington, D. C.

Application October 13, 1933, Serial No. 693,489

1 Claim. (Cl. 296—97)

My invention relates to an anti-glare screen adapted to be readily and quickly secured in a detachable manner to the windshield of an automobile in the line of vision of the driver to shield the eyes of the driver from the glare of headlights of approaching automobiles.

One object of my invention is to provide an anti-glare medium for effectively diffusing the light beams of the headlights of an approaching automobile and thereby to prevent accidents due to bright and glaring headlights.

Another object of my invention consists in the details of construction and in the novel combination and arrangement of the several parts of the anti-glare screen whereby more efficient results are obtained.

The improved anti-glare screen embodying my invention will be better and more fully understood by reference to the following description, taken in connection with the accompanying drawing, in which—

Figure 1 is an inside elevational view of a portion of a windshield of an automobile and the anti-glare screen associated therewith.

Figure 2 is an end view of the anti-glare screen secured to a windshield of an automobile.

Figure 3 is a view in perspective of the anti-glare screen.

Briefly stated, my invention comprises a light diffusing member consisting of a rectangular shaped portion of foraminous fabric folded back on itself and having the free ends secured together; one of the folds being straight while the other fold is longer than the first fold and forms a curve with respect to the first fold; a rubber suction cup; and means for securing the light diffusing member in an angular position with reference to the plane of the suction cup and of the windshield of the automobile to which the suction cup is detachably secured.

Many devices have heretofore been made in various forms for protecting the vision of the driver from the glaring lights of approaching vehicles, but none have been so effective as to come into general use.

The combination of a straight fold of foraminous material with an arc shaped fold has proved in use an unusually effective anti-glare screen in eliminating the glare of bright headlights from an approaching automobile. The curved fold of the screen in combination with the straight fold effectively diffuses the glare of approaching bright lights and at the same time permits unrestricted vision of the driver through the screen. The curved fold of the screen being substantially in the form of an arc permits any degree of diffusion of light to be obtained by the driver slightly shifting his line of vision through the screen.

Referring to the drawing, Figure 1 shows a portion of a windshield 10 of an automobile mounted in the frame 11 and having the preferred form of my invention detachably secured to the windshield by means of the suction cup 24.

The anti-glare screen consists of a rectangular portion of foraminous material, such as wire mesh screen, so folded that one section is of a greater length than the other section and the free ends of the material are secured together. This arrangement provides, as is clearly shown in Fig. 2 and Fig. 3, a straight fold 12 and a curved fold 13. The free ends 14 of the material are secured together in any convenient or desired manner, and it has been found convenient to secure the ends 14 between a U shaped strip 15 by inserting the ends and tightly clamping the strip upon the ends of the foraminous material. This may readily be done by pressing suitable indentations in the strip 15 as shown at 25.

Secured to the strip 15 is a supporting member 16 which has an eye or bent over end 17. A screw or bolt 18 is attached to a member 20 and the screw 18 is adapted to pass through the eye 17 and be held in place by a wing nut 19.

The member 20 has an eye 21 which is adapted to receive the bolt 22 attached to suction cup 24 and this bolt is secured in place by nut 23.

Any type of suction cup may be used, but a rubber suction cup 24 in which the bolt 22 is embedded in the base thereof has proven very satisfactory. The vacuum cup 24 provides means whereby the anti-glare screen may be secured to a windshield of an automobile at substantially any point thereon so that the anti-glare screen may be arranged in a position to protect the driver against bright and glaring lights of an approaching automobile or other vehicle.

By loosening the wing nut 19 the anti-glare screen can be readily adjusted to any angle with respect to the plane of the suction cup 24 and of the windshield to which it is attached and the anti-glare screen secured in the adjusted position by tightening the wing nut 19 on the screw 18.

While I have herein described and upon the drawing shown an illustrative embodiment of my invention, it is to be understood that the latter is not limited thereby but may comprehend other constructions, arrangements of parts, details and features without departing from the spirit thereof.

Having thus disclosed my invention, I claim:

An anti-glare screen for application to the inner surface of an automobile windshield, including a length of wire screen constructed to provide a front flat section for use immediately adjacent the windshield and a rear curved section beyond the flat section relative to the windshield, the rear section being curved in vertical plane and connected at its upper and lower edges to the similar edges of the flat section, the curvature of the rear section presenting the maximum spacing between the sections at substantially mid-height of the flat section and gradually reducing this spacing in both directions toward the upper and lower edges of the flat section, an attaching member to permit immediate application and removal of the anti-glare screen with respect to any point on the windshield, and a connection between said member and the anti-glare screen as a whole to permit swinging movement of the anti-glare screen in a vertical and in a horizontal plane, whereby the anti-glare screen may be positioned to suit different drivers, removed as an entirety when not desired for use, and adjusted in accordance with the direction of glare beam to be diffused.

MAXEMILIAN E. KOEHLER.